United States Patent [19]

Radecki et al.

[11] 4,170,763
[45] Oct. 9, 1979

[54] CONDUCTIVELY COOLED LASER PUMPING ASSEMBLY

[75] Inventors: Dan J. Radecki, San Jose; Curt H. Chadwick, Los Altos, both of Calif.

[73] Assignee: GTE Sylvania Incorporated, Stamford, Conn.

[21] Appl. No.: 866,512

[22] Filed: Jan. 3, 1978

[51] Int. Cl.² ............................................. H01S 3/045
[52] U.S. Cl. ............................ 331/94.5 D; 331/94.5 P
[58] Field of Search ..................... 331/94.5 D, 94.5 E, 331/94.5 F, 94.5 P

[56] References Cited
PUBLICATIONS

Hahn et al., Dielectric Cavity Raises YAG Efficiency, Electro-optical Systems Design, (Feb. 1975), pp. 11–14.
Radecki, Lamp-Pumped Engineering Feasibility Model Laser Subsystem, Digest of Technical Papers, 1975, IEEE/OSA Conference on Laser Engineering and Applications, May 28–30, 1975.

*Primary Examiner*—William L. Sikes
*Attorney, Agent, or Firm*—John F. Lawler

[57] ABSTRACT

An improved conductively cooled laser pumping assembly comprises a metallic housing having an elliptically shaped bore in which a pump lamp and laser rod are supported along the respective focal axes of the bore. The laser rod is mounted on the tapered end of a conductively cooled metal body by resilient strap means at opposite ends of the rod and with a relatively low melting temperature solder between the body and the rod to enhance thermal contact with the rod and to accommodate the different thermal expansions of the rod and body, thereby minimizing rod strain. The elliptical bore is coated with a heat absorbing substance and contains a similarly shaped one-piece snugly fitting removable glass liner or shell. The shell has removable glass or quartz end plates backed by heat absorbing shims and both the shell and end plates have a dielectric reflective-transmissive coating on their external surfaces for reflecting pump light toward the laser rod while transmitting radiation having unwanted wavelengths to the adjacent conductively cooled housing. The shell and end plates are resiliently axially biased as a unit within the housing to limit relative movement of these parts.

7 Claims, 8 Drawing Figures

CONDUCTIVELY COOLED LASER PUMPING ASSEMBLY

This invention was made under a contract with the Department of the Air Force.

RELATED APPLICATION

Serial No. 866,511 filed Jan. 3, 1978 by Taynai et al, assigned to the assignee of this invention.

BACKGROUND OF THE INVENTION

This invention relates to lasers and more particularly to a conductively cooled lamp pumped rod-type laser.

There has been a continuing problem with conductively cooled solid state lasers in the removal of heat from the optically pumped laser rod. Heat should be transferred efficiently to the supporting rod heat sink by a low resistance thermal path in such a manner as to minimize or eliminate mechanical strain in the rod due to differences in the thermal expansion of the rod and heat sink. At the same time, a mechanically stable rod mount that will withstand vibration and other movements is required. This invention is directed to a structure which meets these requirements.

In addition to the above, there is a need in such lasers for efficient coupling of pump lamp radiation at the desired wavelength to the rod as well as removal of lamp radiation at undesired wavelengths to the adjacent parts of the laser housing. Prior art lasers of this type have utilized a dielectric elliptically shaped shell with a coating that reflects to the rod only the desired pump wavelengths, such technique being described in an article entitled "Dielectric Cavity Raises YAG Cavity Efficiency", by Y. H. Hahn et al published in Electro-Optical Systems Design, February 1975 (Milton S. Kiver Publications). Such lasers, however, have depended upon convection cooling of the shell; that is, the shell is simply exposed to the air or other similar medium. There is no known technique in the prior art for enclosing such a shell in a conductively cooled housing and to do so in such a manner as to preserve the efficient transfer of heat from the shell to the body.

Another aspect of the above type of conductively cooled lasers is the need for accessibility of parts for maintenance and repair without compromising the capability of the assembly to withstand vibration and shock forces. In one prior art pump assembly, a plurality of glass inserts were cemented to the inner surface of the elliptical bore of the housing. Replacement of these inserts required complete disassembly of the structure and reprocessing of the bore which is not only costly and time-consuming but also is difficult to accomplish in the field. This invention is directed to a solution to this problem.

OBJECTS AND SUMMARY OF THE INVENTION

A general object of this invention is the provision of a conductively cooled laser pumping assembly which efficiently directs pump lamp radiation to the laser rod.

A further object is the provision of a laser pumping assembly which is resistant to shock and vibration while having high heat conductivity between the rod/shell and the external conductively cooled parts of the assembly.

Still another object is the provision of a laser pumping assembly with a laser rod mounted to provide an efficient heat conduction path to the external part of the structure without inducing undesired strain in the rod.

These and other objects of the invention are achieved with a laser pumping assembly in which an elliptically shaped one-piece, glass reflecting shell is removably mounted within the bore of the conductively cooled metal housing under a resilient biasing force while maintaining efficient heat transfer between these parts. The laser rod is supported on one of the focal axes of the shell by a conductively cooled body to which the rod is connected by a combination of a low melting point solder and resilient mechanical means. The solder permits high heat transfer between contacted parts of the rod and body and the mechanical connection secures the parts together while permitting different thermal expansions between the body and rod so as not to stress the latter.

DESCRIPTION OF PREFERRED EMBODIMENT

Figure 1:
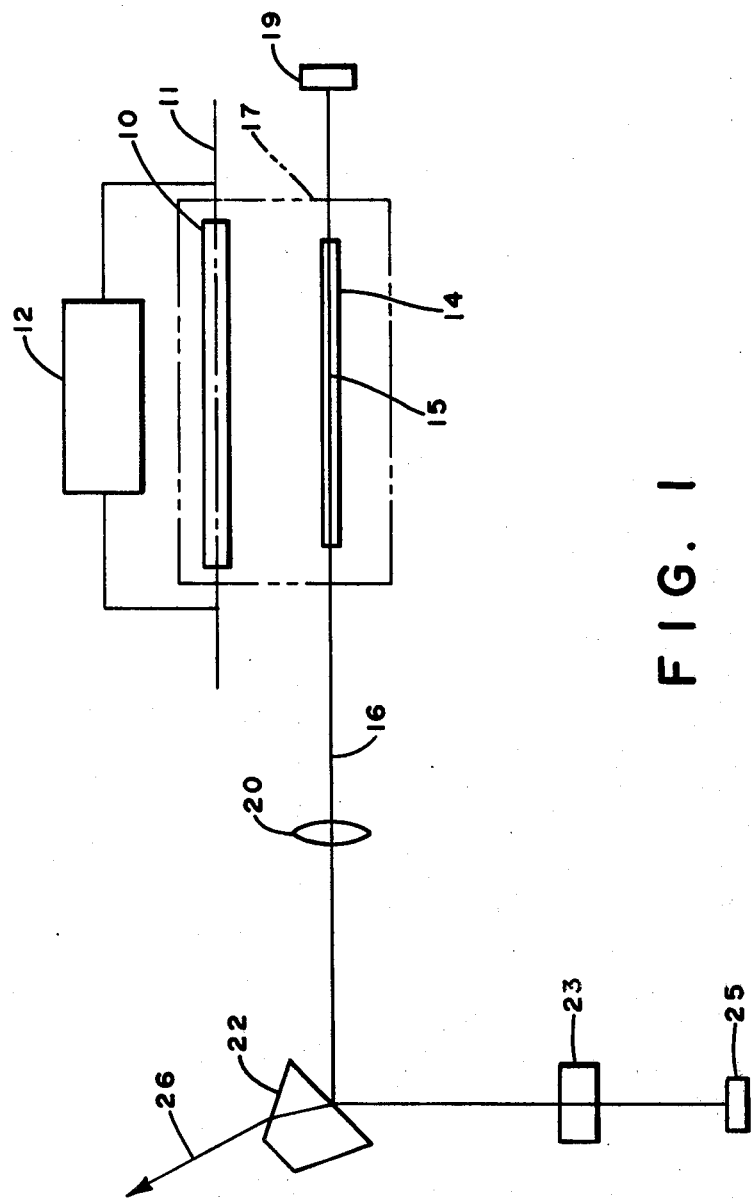
FIG. 1 is a simplified schematic drawing of a laser system of the type which embodies this invention.

Referring now to the drawings, FIG. 1 is a schematic representation of a laser system of the type in which the invention is embodied. The system comprises a laser pump lamp 10 having an axis 11 and energized by a power supply 12. Lamp 10, which may be of the alkali metal arc type, illuminates and optically pumps a rod 14 of lasing material, such as neodymium doped yttrium-aluminum-garnet (Nd:YAG), having an axis 15 along which the coherent light 16 is generated. Lamp 10 and laser rod 14 are mounted within a pumping assembly indicated in broken lines at 17 and described in greater detail below.

Coherent light generated by rod 14 typically has a wavelength of 1.064 $\mu$m and in the system shown by way of example in FIG. 1 is reflected by end mirror 19 back through rod 14, passes through a lens 20 and is again reflected by folding mirror 22 through a frequency doubling crystal 23 such as barium sodium niobate ($Ba_2NaNb_5O_{15}$). This crystal doubles the frequency of a portion of the light beam so as to produce a beam of 0.532 $\mu$m wavelength along with the remaining undoubled fundamental beam which are totally reflected by end mirror 25 back through crystal 23 where a second portion of the fundamental is also converted to the second harmonic, then to mirror 23 which is coated to transmit the 0.532 $\mu$m wavelength light while reflecting the 1.064 $\mu$m light. The output 26 from mirror 22 is therefore green light having a wavelength of 0.532.

Figure 2:
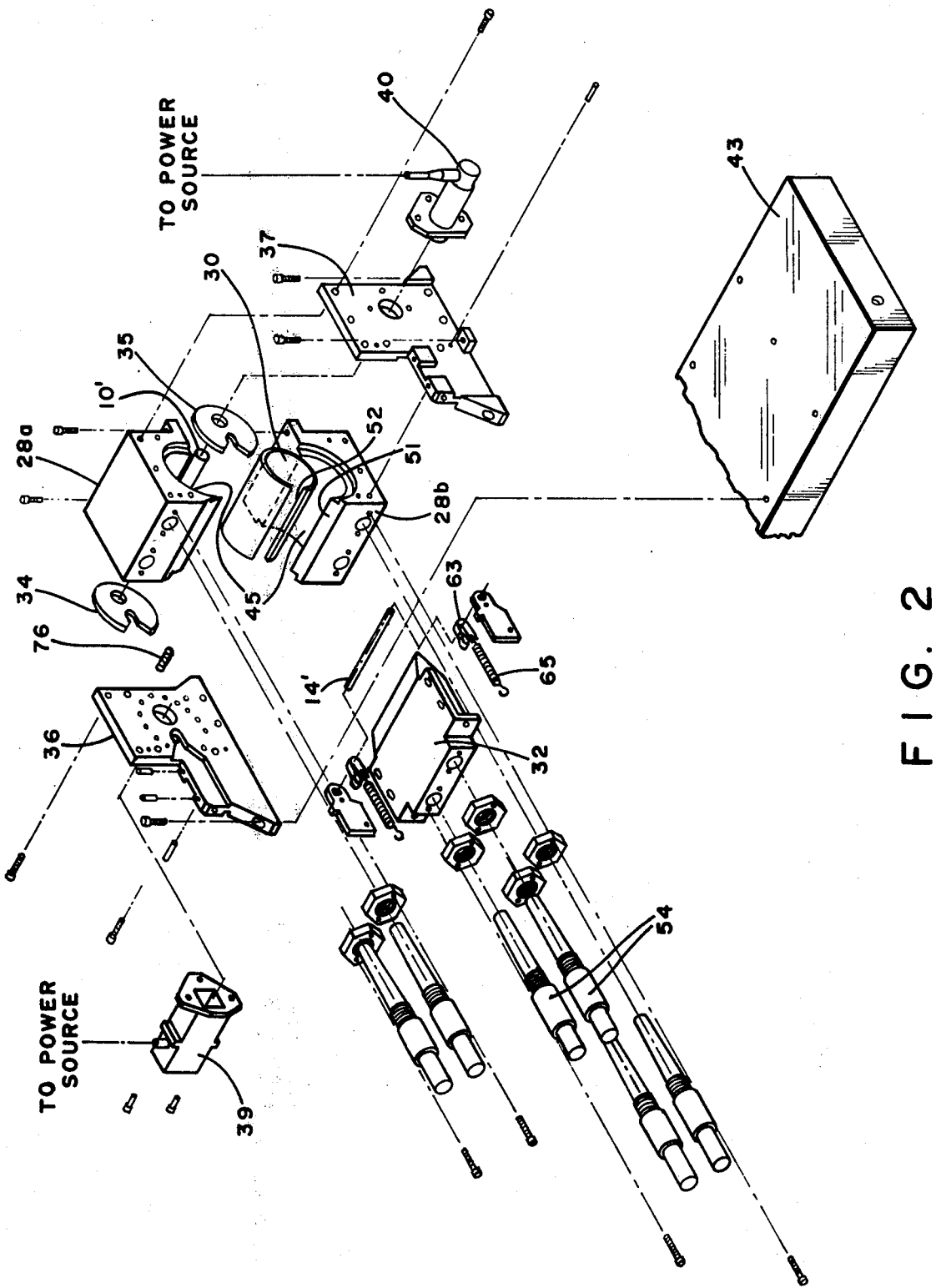
FIG. 2 is an exploded view of a laser pumping assembly embodying this invention.
Figure 3:
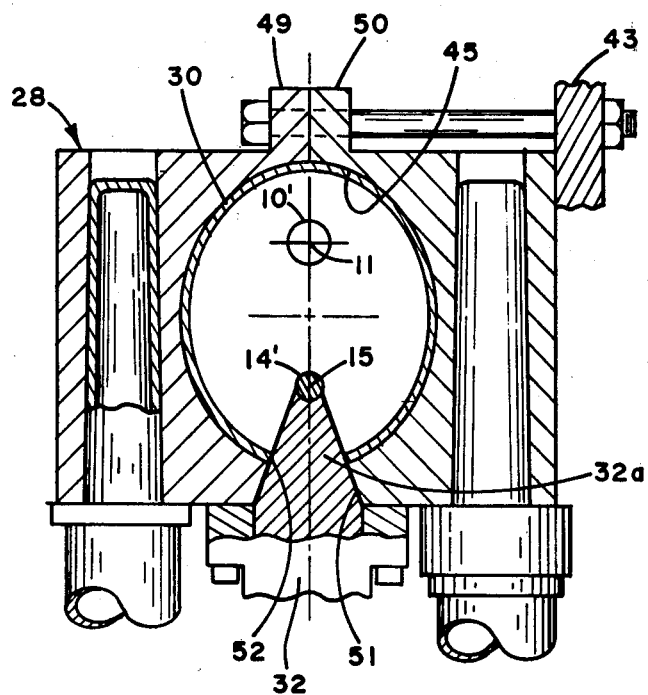
FIG. 3 is a transverse section of the assembly showing the relative positions of the laser rod, pump lamp and elliptical shell.

Pumping assembly 17 is shown in detail in FIGS. 2 and 3 and comprises a split housing 28 with two sections 28a and 28b, a unitary elliptically shaped transparent shell 30 such as quartz or heat resistant glass, disposed within the housing, laser rod 14' supported on one end of a heat conducting body or heat sink 32 within shell 30, transparent end plates 34 and 35 of quartz or the like over opposite ends of shell 30, and support plates 36 36 and 37 secured to opposite ends of the housing and over end plates 34 and 35.

Pump lamp 10' extends through end plates 34, 35 and support plates 36, 37 for connection at opposite ends to a cathode mount 39 and an anode mount 40, respectively, both mounts being connected to power source 12.

Housing 28 has an elliptically shaped bore 45, see FIG. 3, with focal axes which are coincident with the axes 11 and 15 of the pump lamp and laser rod, respectively, when the pumping assembly is fully assembled. The interior of bore 45 is coated with a radiation absorbing substance such as black chrome.

Shell 30 is also elliptically shaped and dimensioned so as to fit snugly within bore 45 so that the bore and shell have coincident focal axes. The external surface of shell 30 has a multilayer dielectric coating which is designed to transmit lamp wavelengths not used to pump the laser rod and to reflect lamp wavelengths useful in pumping the laser rod. The unwanted lamp radiation which passes through this coating is absorbed by the black chrome layer on the housing bore surface and the resulting heat is transmitted by conduction through the housing to heat pipes 47 inserted in appropriate passages in the housing and connected to external refrigeration means, not shown. The elliptical shell with its optically reflective-transmissive multilayer dielectric coating is part of the prior art and does not per se constitute this invention.

Housing sections 28a and 28b are connected together by flanges 49 and 50, respectively, along a plane which contains the focal axes of the bore and shell. The opposite side wall of the housing has an elongated opening 51 which overlies and registers with a similar opening or slot 52 in shell 30. These openings provide access to the interior of the housing and shell through which the heat sink 32 is inserted, which in turn supports laser rod 14' on the focal axis of the cavity.

Figure 4:
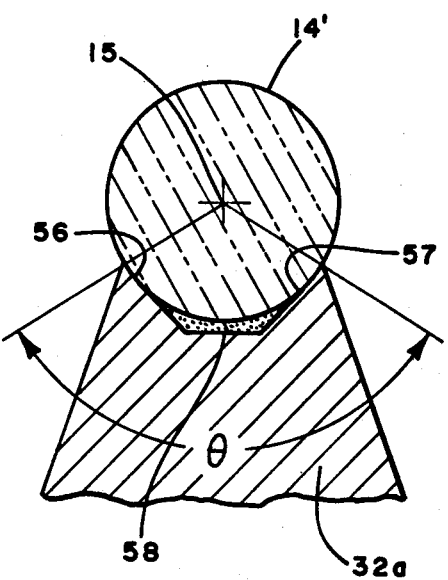
FIG. 4 is a greatly enlarged view of the laser rod portion of FIG. 3.

Heat sink 32 for laser rod 14' comprises a conductive body having recesses for receiving cooling pipes 54 for conductively cooling the structure in the manner similar to that for housing 28. In accordance with this invention, rod 14' is mounted on the tapered end 32a of the heat sink body, see FIG. 4, the rod being engaged substantially tangentially at arcuately spaced points 56 and 57 and being separated from the intermediate parts of the body by a small gap 58. The surface of rod 14' between contact points 56 and 57 has an arcuate extent of $\theta$. Radiation shields, not shown, may be provided to cover the portions of the heat sink within the elliptical cavity.

Gap 58 contains a solder having a relatively low melting point, i.e., approximately 10° C., and high heat conductivity in the liquid state. By way of example, the solder useful for this purpose is an indium-gallium-tin composition made by American Indium Corporation and designated as Alloy #51. At room temperature a bond is formed between the rod and heat sink by the solder. The liquid solder wets both the heat sink and the laser rod with excellent adherence and makes a near perfect thermal contact. In addition, the solder has a low vapor pressure and high reflectivity which are advantageous in the high radiation fields of the pump light. Minimal strain is induced in the rod by use of the solder bond because the laser rod temperature typically is approximately 10° C. or slightly less when the laser is operating. Thus the rod and heat sink are capable of expanding and contracting independently down to 10° C. and no induced stress is transmitted to the rod by the solder joint at higher temperatures. This results in significant improved laser performance because stress induced birefringence leading to depolarization of the laser beam in passing through the rod is considerably diminished.

Figure 6:
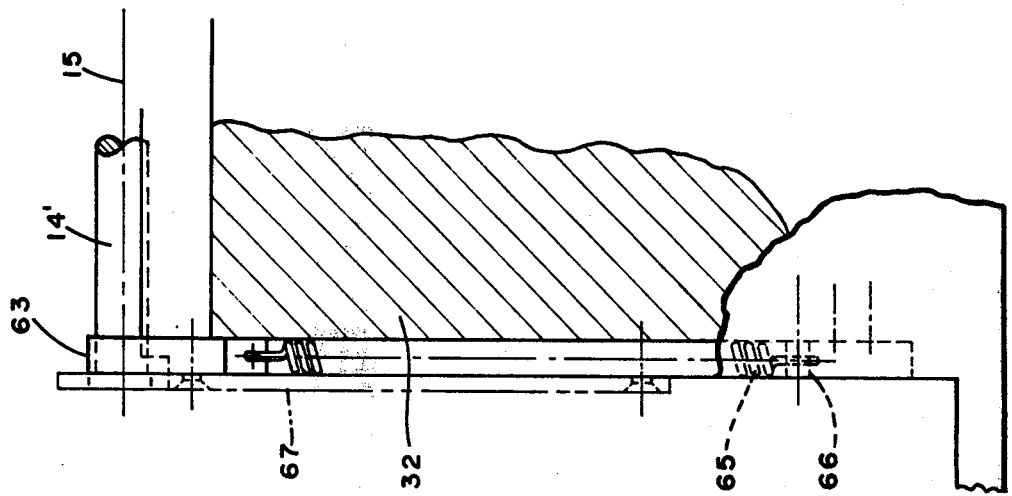
FIG. 6 is a view taken on line 6—6 of FIG. 5.
Figure 5:
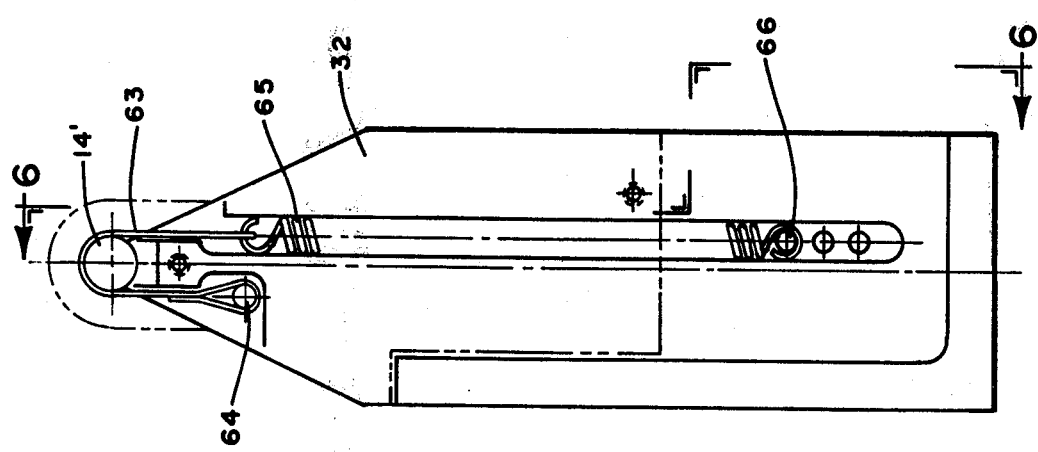
FIG. 5 is an enlarged elevation showing the connection of the laser rod to the heat sink by a spring loaded strap.

Rod 14' is slightly longer than adjacent parts of heat sink 32 and is disposed so that the rod ends project slightly beyond opposite ends of the heat sink. This length differential insures against solder covering the ends of the rod. Each of these overhanging rod ends is clamped to the heat sink by a strap 63, see FIGS. 5 and 6, anchored at one end to the heat sink body by pin 64 and at the opposite end by a spring 65 secured to the body by a pin 66. The tension of spring 65 is adjusted by selection of the location of pin 66 and permits slight relative movement between the rod and heat sink due to thermal expansion and contraction while preventing undue freedom of movement between these parts that might damage the rod. Each clamping mechanism is covered by an end cover 67 secured to the sides of the heat sink which protect the anti-reflection coatings in each end of the rod.

Figure 7:
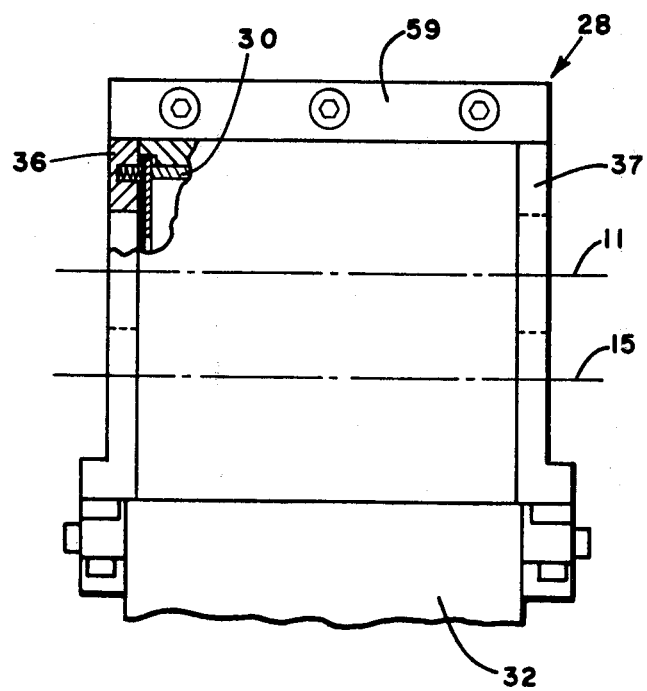
FIG. 7 is an elevation of the pumping assembly.

Glass shell 30 may lose reflectivity over a period of time due to degradation of dielectric coating or due to contamination of the shell's inner surface because of the high temperature and radiation environments to which it is subjected during operation of the laser. In order to provide for convenient and quick replacement of shell 30, support plates 36 and 37 are removably connected to housing 28. Opposite ends of shell 30 are closed by abutting end plates 34 and 35 as shown in detail in FIGS. 7 and 8. Each end plate 34, 35 is dimensioned so its peripheral portion extends into a recess 70 in the elliptical surface of the housing.

In order to further enhance the efficient transmission of pump light to the laser rod and to remove undesired radiation from the ends of the cavity, the exterior surface of each end plate has the same multilayer dielectric coating that is applied to the external surface of shell 30. The coated outside surface of end plate 34 is indicated at 72 in FIG. 8. Adjacent to and covering these coated end plate surfaces are thin metallic shims, one of which is shown at 74 in FIG. 8, having inside surfaces covered with a light absorbing substance such as black chrome. Shims 74 absorb the undesired lamp radiation transmitted through the dielectric coating on the end plates and transmit this as heat to support plates 36 and 37 for removal through the cooling system.

Figure 8:
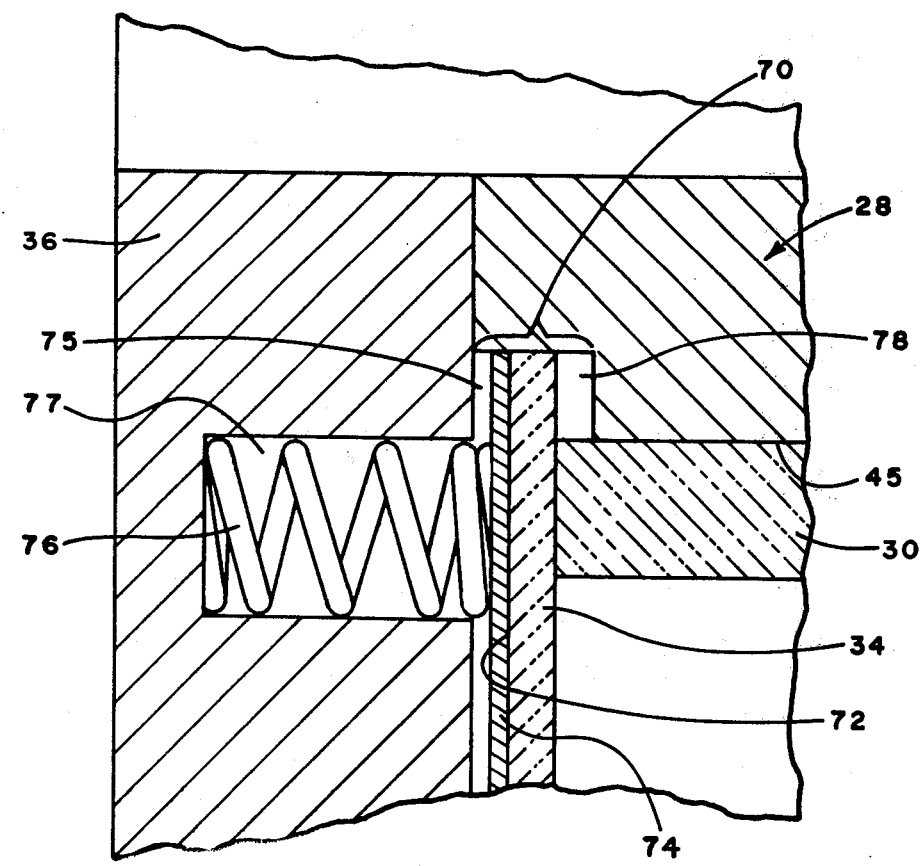
FIG. 8 is a greatly enlarged view of a portion of FIG. 7 showing details of the end plate connection.

The subassembly consisting of shell 30, end plates 34 and 35, and shims 74 is removable axially from the housing cavity for maintenance and replacement if necessary. This invention is described and claimed in copending application Ser. No. 866,511 described above. Small axial dimensional differentials between shell 30 and housing 28 due to operating temperature differences are accommodated by an axial clearance 75 between shim 74 and support plate 36 and by clearance 78 within gap 70. Clearance 75 is held to a minimum in order to provide efficient heat transfer from the shim to the end plate and is preferably 0.001–0.005 inches. In order to hold these subassembly parts tightly together, a plurality of retainer springs, one of which is shown at 76 in FIGS. 2 and 8, are mounted in appropriate axially parallel recesses 77 in support plate 36 and abut against shim 74. The shell-end plate-shim subassembly is thus axially resiliently held against support plate 37 so as to make it vibration resistant while accommodating thermal expansion and manufacturing tolerances.

What is claimed is:

1. In a conductively cooled laser pumping assembly comprising a split housing having an elliptically shaped bore with first and second focal axes, said sections being connected symmetrically about a plane containing said axes and being spaced apart adjacent to said first axis whereby to define an elongated opening in said housing, a unitary elliptically shaped transparent shell snugly fitted in said bore and having focal axes coincident with said first and second axes, respectively, said shell also having an elongated slot aligned with said opening in said housing, lamp means supported within said shell and having an axis coincident with said second axis, said lamp means being adapted to radiate noncoherent light at desired laser pump wavelength $\lambda_1$ and at undesired wavelengths $\lambda_v$, said shell having a filter coating thereon, said coating being highly reflective at $\lambda_1$ and highly transmissive at $\lambda_v$, and a cylindrical rod of lasing material supported within said shell with the rod axis coincident with said second axis, the improvement comprising means for supporting said rod comprising
- a heat conductive body having one end within said shell and the opposite end outside said housing,
- solder means between said rod and said one end of said body, said solder means having a melting temperature substantially at room temperature, and
- clamp means connecting opposite ends of said rod to said body.

2. The assembly according to claim 1 in which said body engages said rod tangentially at arcuately spaced locations on the surface of the rod and is spaced from said rod between said locations to define a gap, said solder means being disposed in said gap.

3. The assembly according to claim 1 in which said rod is longer than adjacent parts of said body whereby opposite ends of the rod overhang corresponding ends of the body.

4. The laser assembly according to claim 2 in which each of said clamps comprises a metallic band looped over the end portions of the rod, said band being resiliently anchored to said body.

5. In a conductively cooled laser pumping assembly comprising a split housing having an elliptically shaped bore with first and second focal axes, said sections being connected symmetrically about a plane containing said axes and being spaced apart adjacent to said first axis whereby to define an elongated opening in said housing, a unitary elliptically shaped transparent shell snugly fitted in said bore and having focal axes coincident with said first and second axes, respectively, said shell also having an elongated slot aligned with said opening in said housing, lamp means supported within said shell and having an axis coincident with said second axis, said lamp means being adapted to radiate noncoherent light at desired wavelengths $\lambda_1$ and at undesired wavelengths $\lambda_v$, said shell being covered by a thin layer of a dielectric substance, said layer being highly reflective at $\lambda_1$ and highly transmissive at $\lambda_v$, and a cylindrical rod of lasing material supported within said shell with the rod axis conicident with said second axis, end plates engaging opposite ends, respectively, of said shell, said end plates being formed of a material substantially transparent to radiation at wavelenghts $\lambda_1$ and $\lambda_v$, each of said plates having a coating of said dielectric substance on the exterior surface thereof whereby to reflect radiation at $\lambda_1$ into said shell and to transmit radiation at $\lambda_v$, heat conductive support plates secured to said housing at opposite ends, respectively, of said bore and over said end plates, respectively, said support plates being adapted to remove heat produced by said $\lambda_v$ radiation, the improvement comprising means for resiliently biasing said shell and said end plates relative to said support plates.

6. The assembly according to claim 5 with a shim between each of said end plates and the adjacent support plate, each of said shims having a radiation absorbant substance on the surface engaging the adjacent end plate.

7. The assembly according to claim 6 in which one of said shims is spaced from the adjacent support plate, said biasing means comprising a plurality of springs between said one of said shims and said adjacent support plate.

* * * * *